United States Patent
Pishevar et al.

(10) Patent No.: US 7,124,107 B1
(45) Date of Patent: Oct. 17, 2006

(54) COLLECTIVE PROCUREMENT MANAGEMENT SYSTEM

(75) Inventors: Shervin Pishevar, Gaithersburg, MD (US); Drew E. Morris, Alpine, NJ (US)

(73) Assignee: Freewebs Corporation, Silver Spring, MD (US)

( * ) Notice: Subject to any disclaimer, the term of this patent is extended or adjusted under 35 U.S.C. 154(b) by 0 days.

(21) Appl. No.: 09/326,646

(22) Filed: Jun. 7, 1999

(51) Int. Cl.
    *G06Q 40/00* (2006.01)
(52) U.S. Cl. .......................... 705/37; 705/26
(58) Field of Classification Search .................. 705/37
    See application file for complete search history.

(56) References Cited

U.S. PATENT DOCUMENTS

| | | | | |
|---|---|---|---|---|
| 6,260,024 B1 * | 7/2001 | Shkedy | | 705/37 |
| 6,260,025 B1 * | 7/2001 | Silverman et al. | | 705/37 |
| 6,269,343 B1 * | 7/2001 | Pallakoff | | 705/26 |
| 6,466,919 B1 * | 10/2002 | Walker et al. | | 705/37 |
| 6,606,608 B1 * | 8/2003 | Bezos et al. | | 705/37 |
| 7,013,290 B1 * | 3/2006 | Ananian | | 705/27 |
| 2002/0143692 A1 * | 10/2002 | Heimermann et al. | | 705/37 |
| 2004/0083156 A1 * | 4/2004 | Schulze | | 705/37 |
| 2004/0177026 A1 * | 9/2004 | Balabon | | 705/37 |
| 2004/0204987 A1 * | 10/2004 | Hill et al. | | 705/14 |
| 2005/0010521 A1 * | 1/2005 | Muelier et al. | | 705/37 |
| 2005/0234808 A1 * | 10/2005 | Goto et al. | | 705/37 |

FOREIGN PATENT DOCUMENTS

JP          10269374 A   * 10/1998

OTHER PUBLICATIONS

Parity Trademark History, Aug. 1992, 31 pages.*

* cited by examiner

*Primary Examiner*—Charles R. Kyle
(74) *Attorney, Agent, or Firm*—Charles A. Rattner

(57) ABSTRACT

A collective procurement management system which permits multiple potential purchasers of a specific item or service to submit orders for the item or service on an ongoing basis. As orders enter the system, they are grouped such that potential purchasers are may "cooperate" in generating a collective bulk order so that all participants may obtain discount/volume pricing. Once a threshold level of order volume is obtained as a result of multiple orders, the grouped order is submitted to the supplier for fulfillment. The order is then fulfilled at a volume pricing level although individual portions of the collective order are routed to a plurality of purchasers. The present invention also includes a Reverse Auction Process (RAP) which, in one embodiment, operates to allow potential purchasers to select a product or service and set a maximum price that they are willing to pay for the same. Following submission of this information to the system, possibly including orders for the same item from other potential buyers, potential vendors bid to supply the item to the relevant buyers requesting the item.

23 Claims, 5 Drawing Sheets

PURCHASE ORDER SUBMISSION SCREEN

ITEM DESCRIPTION — 510
PENCIL - 3MM SOFT LEAD #2 - 1 GROSS

ITEM STOCK NUMBER — 560
JR726-D41

MANUFACTURER — 520
ACME PENCIL CORP

SUPPLIER — 570
NON-SPECIFIED

MAXIMUM PRICE — 530
$ 12 . 50

QUANTITY DESIRED — 580
0012

LATEST SHIP DATE — 540
JUNE / 12 / 1999

SHIP COST - TOTAL — 590
$ 10 . 95

SHIPPING ADDRESS — 550
ADVANCED COGENITCS, INC.
1271 MAIN ST.
SUITE 300
ANYTOWN, PA 14217
ATTN.: S. SMITH

CLICK HERE FOR BILLING SCREEN — 525

SUBMIT — 535

FIG. 5

COLLECTIVE PROCUREMENT MANAGEMENT SYSTEM

FIELD OF THE INVENTION

The present invention relates generally to automated systems and methods for transaction processing and more particularly to systems and methods for efficiently and optimally processing purchase and sale orders for goods and services.

BACKGROUND OF THE INVENTION

Business is all about commercial transactions. These transactions result in the critical revenue streams necessary for businesses to survive. In some cases, businesses purchase goods or services which are helpful or necessary for the company to operate. Goods and services may be purchased as "overhead" (e.g. pencils and pens for employees) or for redistribution to the ultimate consumer (e.g. software to be distributed by a PC seller in connection with the sale of PCs).

While commercial transactions between parties have occurred practically since the beginning of time, the methodology by which they are conducted has evolved rapidly. This is especially true in recent years with the advent of the computer, the internet and other communications technologies.

One recent development has been so called "on-line commerce". This umbrella term generally refers to the conduct of business and the consummation of business transactions through an electronic medium available to both parties through which orders may be communicated and processed. For example, consumers may purchase various goods through on-line stores available on the internet. In this case, the age old requirement of a face to face transaction in, for example, a retail brick and mortar store is unnecessary. Instead, a consumer reviews available offerings on the internet, selects one for purchase and orders it. The consumer may pay for the purchase by credit card and receive the item in the mail a few days later.

In addition to the above described business to consumer transactions, business to business transactions which occur via computers and various communications systems have also become commonplace. For example, electronic commerce ("e-commerce") systems, services and software exist whereby companies may enter into purchase and sale transactions on an automatic or semiautomatic basis. Through the use of these e-commerce systems, purchasing entities may, for example, be set up to automatically receive re-orders of consumable supplies on a rolling basis from a predetermined supplier. In some cases, the price and quantity may be pre-negotiated or at least known ahead of time by the purchaser. In other cases, the purchasing entity may agree that it will accept a certain quantity on a rolling basis at the then current market price, whatever it may be. Communication in these systems between buyers and sellers may occur through various communication channels such as the internet, private local or wide area network or dialup access.

While these systems are extremely successful, they do suffer drawbacks. In particular, these systems generally operate under the restriction that the supplier-purchaser relationship is predefined and relatively inflexible. By way of example, existing e-commerce systems and services generally require the purchaser to preselect its supplier with respect to specific goods and/or services. After selection, these goods and services are provided exclusively by the preselected supplier regardless of price or terms. As mentioned above, in many cases where rolling orders are used, the purchasing entity is required to accept goods/services at a future price which is likely unknown at the time of the initial order or when the relationship is set up. This can be disadvantageous to the purchaser not only in terms of pricing but also in terms of product/service quality and fitness for purpose. In other words, the purchaser may, due to a prior commitment made to a supplier, be stuck with an inferior product/service or one that does not meet its needs as well as another product/service which would otherwise be available to the purchaser.

SUMMARY OF THE INVENTION

It is therefore an object of the present invention to overcome the disadvantages and drawbacks of prior art systems and methods.

It is another object of the present invention to provide a flexible and efficient system which provides a buyer with the opportunity to obtain desired goods and services at prices which would otherwise be unavailable to such a buyer.

It is yet another object of the present invention to provide a system which automatically and systematically groups potential buyers of products and services with each other in order to obtain optimal pricing on such products and services.

It is a still further object of the present invention to provide a method by which potential buyers may be automatically placed into a buying cooperative with other potential buyers of the same item or items so that volume pricing may be obtained by all buyers in the cooperative.

It is another object of the present invention to provide a transaction system and methodology through which suppliers and buyers may be matched in an online environment.

It is another object of the present invention to provide a system which provides automatic ordering capabilities for potential purchasers wherein the delegation level of order control may be automatically adjusted over time and/or as a result of various events.

It is another object of the present invention to provide an ordering system and method through which purchasers may specify multiple price points for purchase of a particular item whereby selective fulfillment of the order is dependent upon the time since the order as well as other orders submitted by other potential purchasing entities.

It is a still further object of the present invention to provide a reverse auction process whereby potential suppliers may bid against one another to satisfy a collective order according to required prices and terms dictated by multiple potential purchasers.

The above and other objects are achieved through the novel transaction management system of the present invention. In one embodiment of the present invention, multiple potential purchasers of a specific item or service submit orders for the item or service on an ongoing basis. As orders enter the transaction system, they are grouped such that potential purchasers are automatically set up to "cooperate" in order to obtain discount/volume pricing. Once a threshold level of order volume is obtained as a result of multiple orders, the grouped order is submitted to the supplier for fulfillment. The order is then fulfilled at a volume pricing level although portions of the collective order are routed individually to a plurality of purchasers.

As may be seen, the system of the present invention produces significant advantages for both the supplier and the individual potential purchasing entities. The suppliers benefit by receiving large orders for specific products/services at one time and the potential purchasers benefit by obtaining pricing discounts that would otherwise be unobtainable. In one embodiment of the present invention, potential purchasers specify orders in the form of multiple "fulfillment level" at different price points. In this case, a potential purchaser may submit an order ("primary fulfillment level") through which they agree to pay a specific price if the order is filled within a certain time frame. Whether or not the order is filled at this price is dependent upon the amount and timing of other orders for the same item made by other parties. Additionally, in this embodiment, the potential purchaser may specify additional fulfillment levels ("secondary fulfillment levels") through which the potential purchaser agrees that if the primary fulfillment level is not met and the order not filled at the specified primary price, the potential purchaser would be willing to accept the product at a different (higher or lower) price during a different time frame.

An additional feature of the present invention is the method by which potential purchasers may automate their purchasing process through a continuing and evolving relationship with its suppliers. For example, rather than submitting purchase orders to the transaction processing system of the present invention on an ongoing basis each time the purchaser requires the same item over time, the purchaser may submit one or more "rolling orders" to the system. In this case, the purchaser may not initially delegate significant authority to the potential supplier with respect to control over the purchaser's orders. However, with the passage of time or as a result of specified events, additional authority may be delegated to the supplier with respect to the purchaser's purchase of either a specific item, a set of items or all items available through the particular supplier.

BRIEF DESCRIPTION OF THE DRAWINGS

FIG. 5 is a representation of an exemplary screen through which a purchaser may enter an order into the transaction processing system of the present invention.

DETAILED DESCRIPTION OF THE PREFERRED EMBODIMENTS

Figure 1:
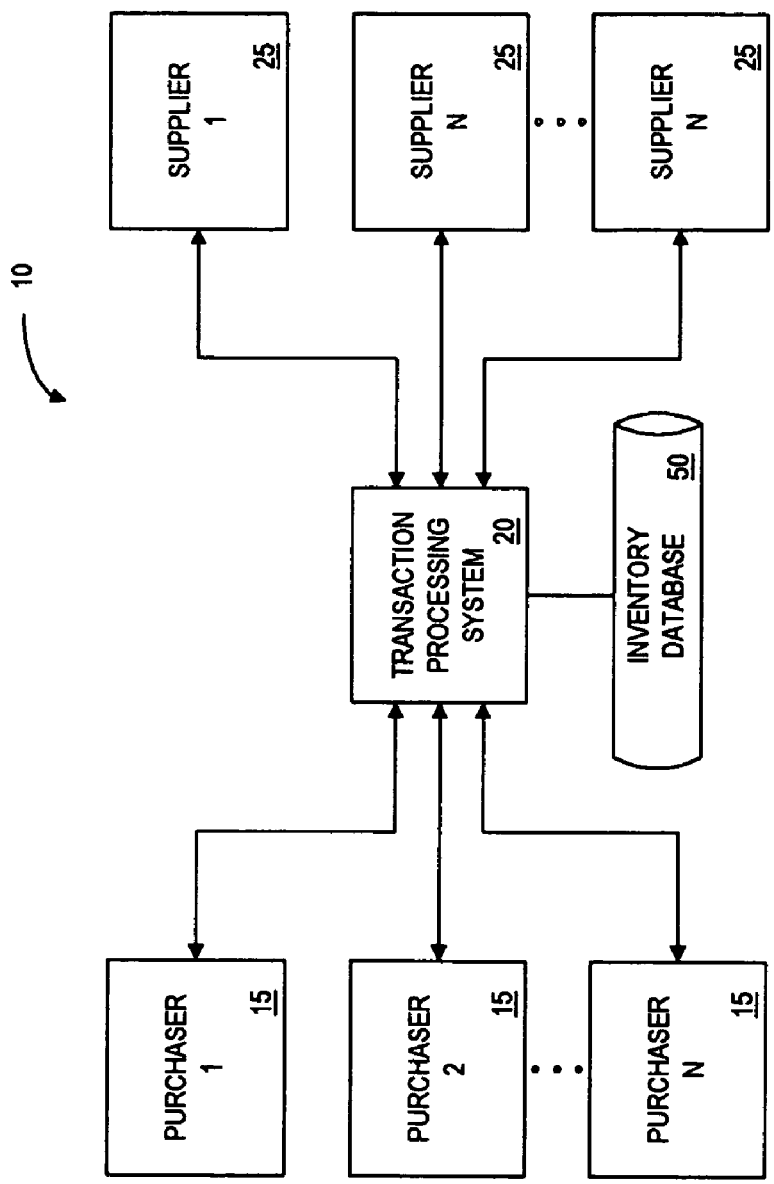
FIG. 1 is a high level block diagram illustrating the major components of the transaction processing system of the present invention.

An overview of the system of the present invention is now provided in connection with FIG. 1. Following this overview, the particular components of the system are discussed in detail as are the methods employed to achieve the objects of the present invention.

System Overview and Capabilities

FIG. 1 illustrates the transaction processing system (TPS) 20 of the present invention as well as various components with which it is in communication in order to accomplish the objectives of the present invention. The overall "system" of the present invention is referred to herein as the system and referenced for purposes of this description as "system 10".

TPS 20 is comprised of various components which are discussed in detail below. In a preferred embodiment of the present invention TPS 20 includes a set of computer programs which collectively perform the transaction processing tasks to be discussed in detail below. These computer programs preferably reside on a server having the necessary processing power and storage capability to accomplish the objectives without subjecting users to unreasonable delays, downtime or failure of results. The server running TPS 20 is deployed so as to have the capacity to communicate with other processing resources and users via the internet. Alternatively or in addition to internet communication, TPS 20 may communicate with other processing resources through private communication networks or through point to point dial up access or according to other communication protocols and networks.

One set of processing resources in communication with TPS 20 are purchaser terminals 15. The system 10 of the present invention may provide for communication of TPS 20 with an unlimited number of purchaser terminals via various communication channels subject to provision of the necessary processing power and communication bandwidth to provide satisfactory response time and system performance in general. Purchaser terminals 15 may be personal computers, dedicated terminals or any other device capable of displaying menus, accepting input from a user, receiving and transmitting information and otherwise communicating with TPS 20. In a preferred embodiment of the invention, purchaser terminals 15 comprise personal computers running an internet browser such as Netscape Navigator or Microsoft Internet Explorer and communicating with TPS 20 over the internet. In this embodiment, menus may be provided to the user as, for example, Java applets (or some other dynamic resource) or as static HTML pages.

TPS 20 further communicates with one or more supplier terminals 25. Again, it is preferable that supplier terminals 25 be personal computers or some other processing resource running a browser or browser like application that permits the display of menus, accepts input from the user and communicates with TPS 20 through the internet. It is also conceivable that a user of the system 10 of the present invention may be both a supplier and a purchaser. In this case, a single terminal may serve both purposes. The primary differences between a supplier terminal 25 and a purchaser terminal 15 from an operational standpoint are the menus displayed and the types of transactions which may be processed and submitted.

In addition to the previously described components, the system 10 of the present invention may also include a separate inventory database 50. Inventory database 50 stores the "inventory" available for purchase or sale through system 10. Thus, each time an order for a particular item or service is requested by a purchaser for the first time, information such as the item description and the assigned item number will be entered into inventory database 50. Following this, the specific item will be available via pull down menus or search screens for order by other purchasers or sale by various suppliers. Conversely, a supplier, upon affiliating with the purchase management service ("PMS"), may load some or all of its catalog of available items through TPS 20 for ultimate storage in inventory database 50. At this point each of the stored items becomes available for purchase by potential purchasers having access to the system 10.

TPS Components

Figure 2:
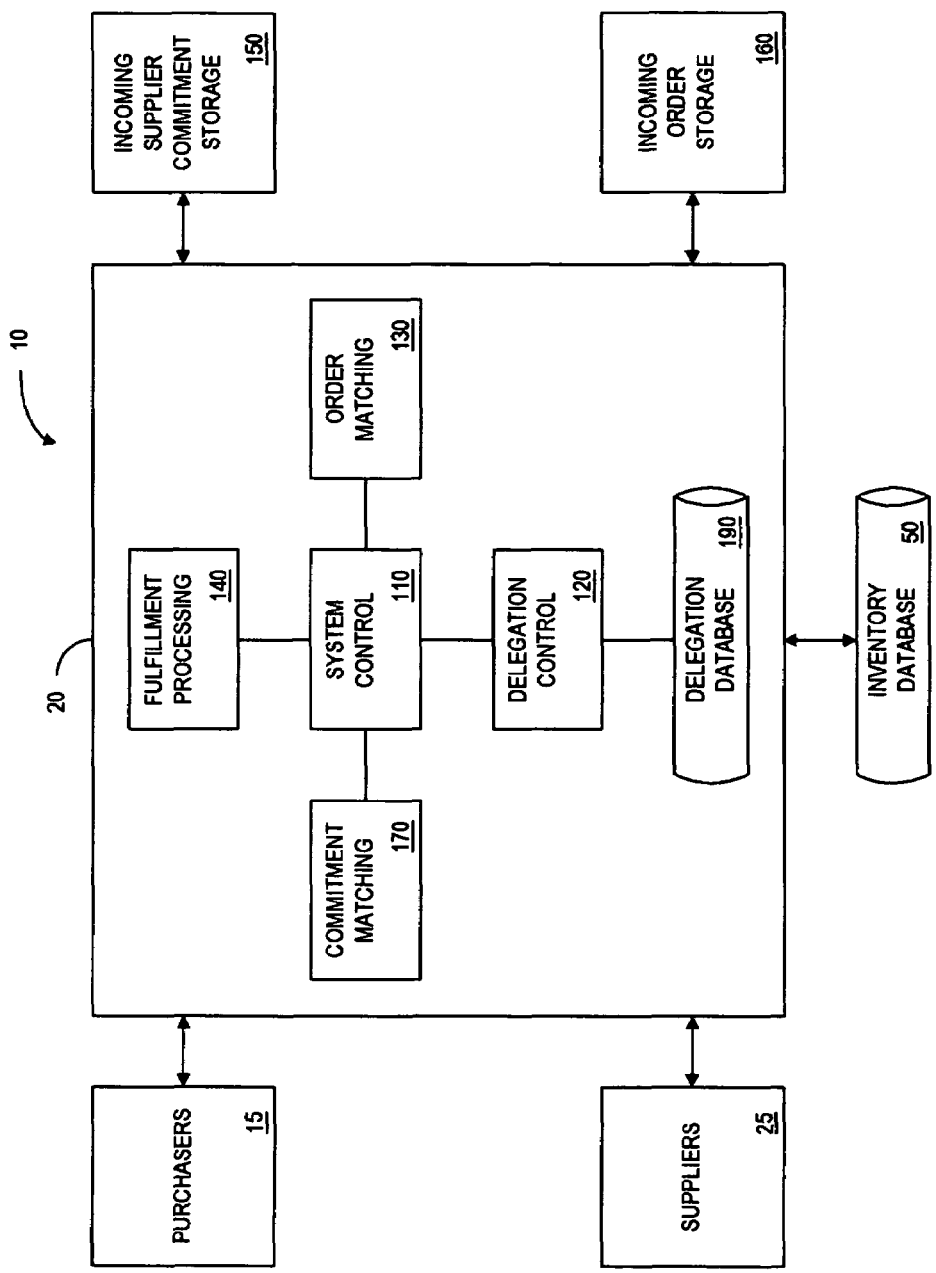
FIG. 2 is a block diagram illustrating, at a more detailed level, the major components of the transaction processing system of the present invention.

FIG. 2 illustrates additional details and components of TPS 20 which we now described in conjunction with that Figure. Turning now to FIG. 2, it may be seen that in a preferred embodiment of the present invention, TPS 20 comprises various components for accomplishing the functions of system 10. In a preferred embodiment, each of these components is implemented as one or more software modules and/or physical processing devices for processing data as required.

System control 110 is the central controller of TPS 20. In this respect, system control 110 initiates, controls, terminates, and monitors all processes occurring in TPS 20. In addition to system control 110, TPS 20 includes various components for accomplishing particular tasks associated with receiving orders, receiving commitments to fill orders, matching orders and fulfilling orders. For example, order matching process 130 functions to group orders for particular items and services as they are submitted to system 10. In this way, individual orders for the same or similar items and service which are submitted by purchasers may be grouped together. In order to accomplish this grouping function, order matching process communicates with inventory database 50. Inventory database 50 stores and provides data respecting all available products and services which are available for purchase through system 10. Additionally, incoming order storage database 160 is provided for the purpose of storing incoming orders as they are pending and up until the time that they may be matched with a supplier commitment for the same product or service.

Similarly, commitment matching process 170 functions to match commitments made by suppliers to supply products and services under specified terms and at specified prices. In most cases, a collective buy order resulting from multiple individual orders will be fulfilled by a single supplier. However, commitment matching process 170 may, in some cases, function to group supply commitments from multiple suppliers so that these multiple suppliers may collectively fill a collective procurement order. For purposes of this description, such a situation is referred to as a co-sell arrangement. Incoming supplier commitment database 150, in a manner similar to incoming order storage database 160, stores supply commitment transactions as they are entered into system 10 by potential suppliers. Storage of commitment transactions is under the direction and control of commitment matching process 170 regardless of whether a co-sell arrangement is called for or fulfillment is to be accomplished by a single supplier.

Fulfillment processing processor 140 is invoked at the time a collective procurement order can be matched by a co-sell arrangement or, more likely, when a single supplier commitment matches a collective procurement order. Fulfillment processing processor 140, at such time, accomplishes the tasks which are associated with order fulfillment when a group of buyers can be matched with one or more sellers with respect to a particular transaction. Such tasks may include, for example, notification to supplier(s) of the transaction match, notification to buyers that their order has been filled and notification to a third party fulfillment company indicating that it should fulfill the consummated transaction. Of course, additional information may be provided in each case, including, for example, the names of the buyers, the names of the supplier(s), the shipping addresses, the pricing and terms information, etc.

Delegation control 120 is a process that controls the amount of delegation afforded to suppliers in supplier first enter into a relationship under which supplier supplies goods or services to the purchaser, delegation may be minimal. In such a case, purchaser may specify that all orders must be pre-approved by purchaser prior to fulfillment by supplier. As the relationship matures, purchaser may be willing to allow supplier to exert more control over the supply of goods and services to the purchaser. For example, in the case of consumable goods, once a good estimate of purchaser's needs for such goods over time can be obtained, purchaser may be willing to allow supplier to fulfill orders on a periodic basis without consulting purchaser prior to every fulfillment event. Perhaps, purchaser may place a limit on the price that purchaser is willing to pay under this rolling automatic supply arrangement. In this case, if supplier were to raise its price a certain threshold above the previous price, it may require purchaser's specific consent prior to fulfillment. This process of assigning a delegation level for each purchaser/supplier pair is controlled and executed by delegation control 120.

Purchase Order Submission

Figure 3:
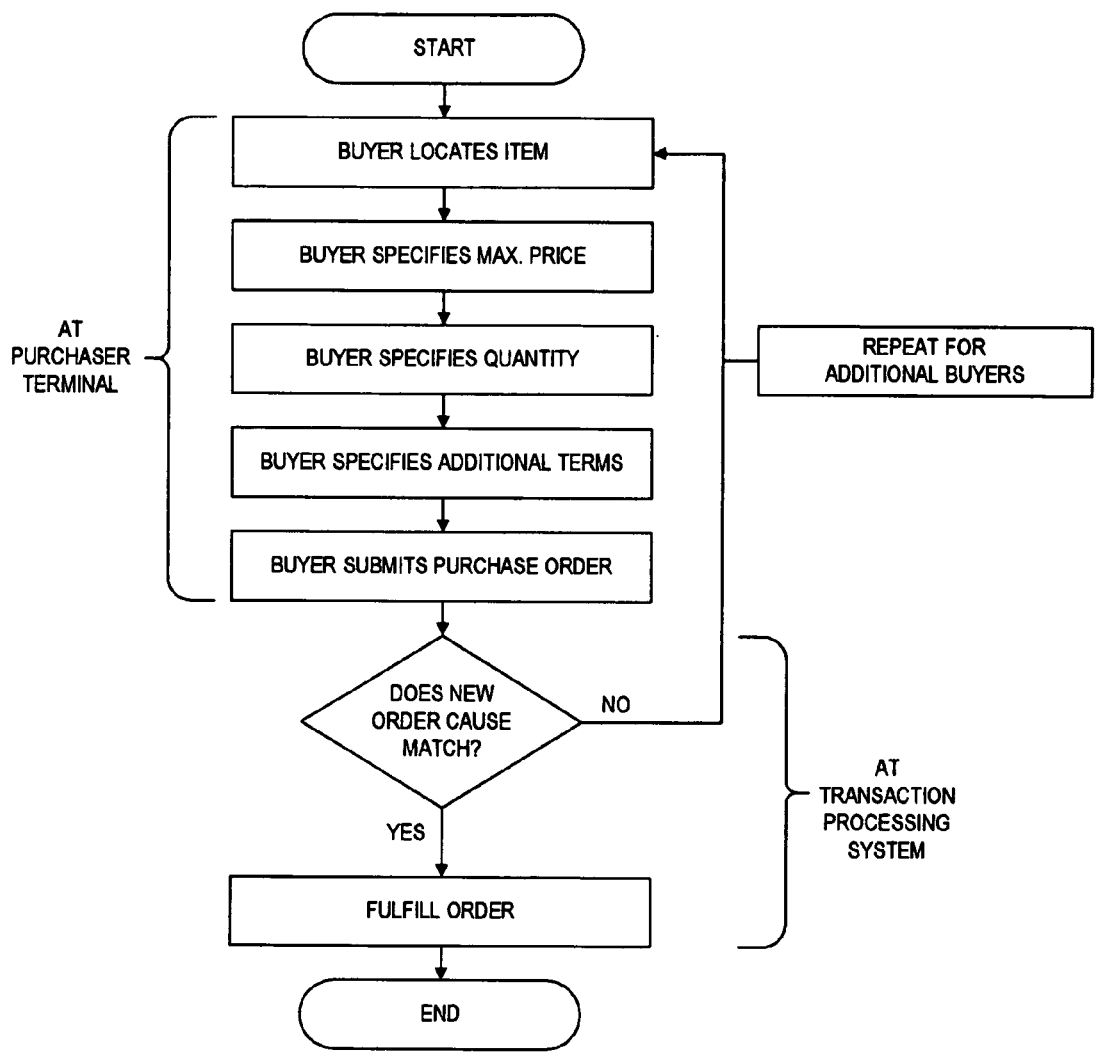
FIG. 3 is a flowchart illustrating the process through which a potential purchaser may enter a purchase order using the system of the present invention and the way in which such an order is processed in the system.
Figure 4:
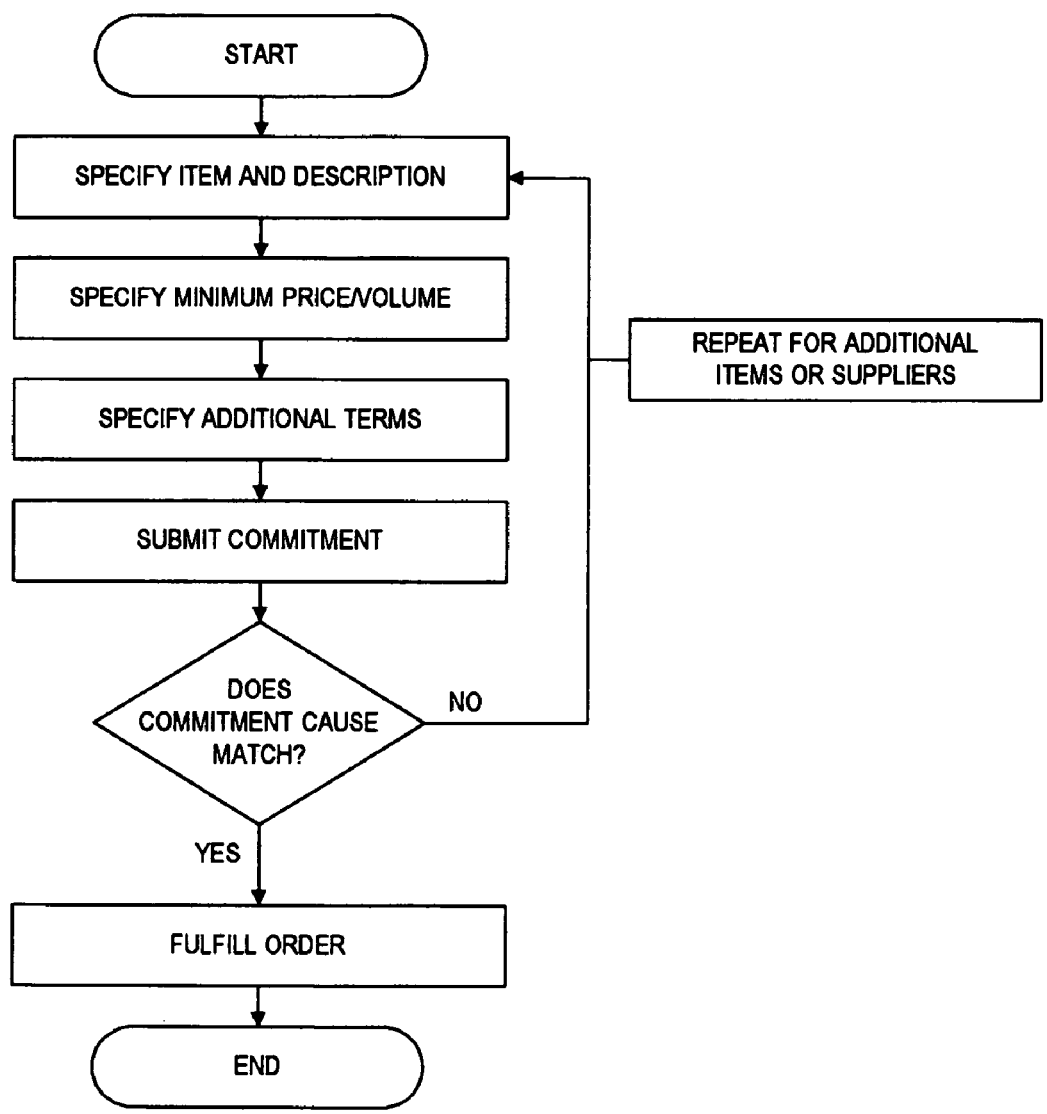
FIG. 4 is a flowchart illustrating the process through which a potential supplier may enter a supply commitment using the system of the present invention and the way in which such a commitment is processed in the system.

FIG. 3 is a flowchart illustrating the overall process of submitting purchase orders, matching them with supply commitments and fulfilling the order according to the methods of the present invention (purchaser point of view). FIG. 4 is a flowchart illustrating the overall process of submitting supply commitments, matching them with purchaser orders and fulfilling the orders (supplier point of view). A description of both processes and how they work together is now provided in conjunction with FIGS. 3 and 4.

In FIG. 3 and from the point of view of the purchasing entity, the process begins when the purchaser locates the item he or she desires. Various search screens and methodologies as are well known in the art may be used to search for and locate desired products and services. Note that as suppliers enter supply commitments into system 10, each item or service is stored in inventory database 50 along with a description and a predefined or then specified identification/stock code. With this in mind, inventory database 50 may be queried by a potential purchaser as is known in the art in order to locate the desired item. In an internet embodiment, various images and descriptions of the products may be displayed through the browser application during the product/service search phase.

Assuming a purchaser locates a product or service he or she desires, the potential purchaser may know specify the maximum price that he or she is willing to pay for the item with respect to the desired quantity. The desired quantity is specified at the next step. As will be discussed in further detail below, an alternate embodiment of the present invention provides the purchaser with the ability to customize the purchase order in many ways. For example, the purchaser may specify that he would be willing to buy an additional quantity if a specific reduction in price was offered. Further, the purchaser might specify that he would be willing to pay the specified price for a certain period of time after which, if his order is not filled, he might be willing to pay a higher price or accept a lesser or greater quantity. The specific custom options alluded to here are described in greater detail below.

Once the quantity and price have been specified by the potential purchaser, the potential purchaser is given the opportunity to specify additional terms and conditions that may apply to the order. Examples of this might be shipping included, insurance included, specific color only, ship to multiple destinations, must ship by specific date, etc. As will be discussed in further detail below, specific terms and conditions available for selection may be demonstrated to the potential purchaser via pull down menus or the like. System 10 operates so as to prevent inconsistent terms or orders with missing information from being submitted to TPS 20. Such "order checking" may, in one embodiment, be accomplished through the use of a Java applet or other dynamic program which is download to the purchaser terminal 15 via the internet.

Once the order has been completed to the potential purchaser's liking and subject to the order checking process, the user may submit the purchaser order to TPS 20 by clicking on a "submit" button. The user may be queried to ensure that he or she truly wishes to submit the order prior to actual submission. Additionally, order checking may occur at TPS 20 upon receipt of the order either as a sole check or in addition to real time order checking occurring at purchaser terminal 15.

Once submitted, the purchase order is received by TPS 20 under the direction of system control 110. System control 110 invokes order matching process 130 which first stores the new order in incoming order storage database 160. Next, order matching process 130 matches the order with any other orders that exist for the same product or service. The check for other matching orders which are qualified to group to form a collective procurement is accomplished through a check of the incoming order storage database 160 which contains information about all previously submitted but yet unfulfilled orders. If there are other orders for the same product or service, they must be qualified further by order matching process 130 to determine if the orders can be grouped. Qualification for grouping is discussed in further detail below but generally requires a check of the requested quantity (vis a vis other potential grouped orders and commitments made by potential suppliers), a check of special terms and conditions which may apply and a check of compatible purchase prices.

If the submission of the current order is determined to be the order that completes the grouping such that a supplier commitment is met, then the order is fulfilled under the direction of system control 110 and fulfillment processor 140 and the process ends. Otherwise, if additional orders are required to meet the terms and conditions of a supplier commitment, then system 10 awaits additional purchase orders through the above-described process until a collection of orders does meet the terms and conditions of a supplier commitment.

Supply Commitment Submission

From the point of view of the supplier and in connection with FIG. 4, the methodology through which a supplier may enter a commitment to supply goods or services using system 10 is now described. Upon initiating the process, the supplier specifies the particular item or service which it wishes to make available to purchasers through system 10. The supplier may also provide various details about the product or service including providing an image which may be viewed by potential purchasers at purchase terminal 15. Macros may be provided to allow a supplier to enter its whole catalog or a large portion thereof into system 10 without having to individually enter each one. In addition to providing product/service details, the supplier may also enter an identification number (e.g. SKU) or one may be assigned by system 10 or both. The supplier also enters the minimum price he or she will accept for a particular item given a specific quantity. In most cases, a supplier might be willing to accept a lower price in return for a large order. This represents the significance of collecting and combining purchase orders to create a collective procurement on the purchaser end. Supplier also preferably enters the quantity of the product which it has available and which it is willing to supply through system 10 as well as the minimum volume it will accept at each particular price point.

As is the case with the purchasers, the supplier may customize the supply commitment with various conditions and terms under which it is willing to supply the product or service. For example, the supplier may specify that it will accept a collective procurement but only one with a maximum of 10 individual purchasers or less. Various additional conditions can be attached to the supply commitment as will be discussed in greater detail below.

Once all terms have specified and a real time order checking process similar to one that has been used with the purchaser order process has ensured that all required terms are present and that there are no inconsistent terms, the supply commitment may be submitted to TPS 20 via supplier terminal 25. Again, upon submission, additional order checking may be performed by TPS 20 in addition to or instead of the checks performed at supplier terminal 25.

Once a supply commitment has been submitted and accepted, the commitment is placed in the incoming supplier commitment storage database 150 under the direction and control of system control 110 and commitment matching process 170. If the submission of this particular commitment can be matched successfully against a pending collective procurement order, the commitment matching process 170 (possibly in combination with order matching process 130) can cause the order to be fulfilled under the direction of fulfillment processor 140.

Example of Purchase Order Submission

A description of an exemplary purchase order submission is now provided in conjunction with FIG. 5. FIG. 5 represents a sample order entry screen which may be provided to a purchaser at purchaser terminal 15 to allow such a purchaser to enter data associated with a purchase order to be submitted. Of course, this is only one example of such a data entry screen and others with the same or different data inputs may be readily substituted.

Item Description input field 510 permits a purchaser to enter an item description. Field 510 may also include a pull down menu for selecting among various items available through system 10. Manufacture input field 520 allows the purchaser to specify a manufacturer of the item desired. In the case of a service, this would typically be the service provider. System 10 may be configured to function such that upon selection of a manufacturer via a pull down menu, item description field 510 pull-down is loaded with all of the selected manufacturer's products/services available within system 10. Alternatively or in addition, a purchaser may specify an item stock number in input field 560. The stock number may be located, for example, through an online search or through a hard copy catalog. In field 570, the user may specify a desired supplier for the item or service.

Additional fields may also be provided to allow the purchaser to more full refine the purchase request. In particular, the purchaser may enter the maximum price he or she is willing to pay for the item in field 530. Additionally, the purchaser may enter the quantity of items that he or she desires for the aforementioned price. In the case of a service, field 550 and/or additional fields may be used to specify particular characteristics of the service desired.

In one embodiment of the invention (not shown in FIG. 5), additional price and quantity data entry fields may be provided in order to allow a purchaser to specify additional fulfillment levels (secondary fulfillment levels) in addition to the already specified initial level. For example, a purchaser might specify a price of $9 and a quantity of 100 for the primary fulfillment level. At the same time, the purchaser might specify a first secondary fulfillment level of $8.75/200. This means that if the supplier is not willing to provide 100 units at $9 per unit, then the purchaser would be willing to accept 200 units at $8 per unit. System 10 and in particular order matching process 130 may be configured to automatically determine the supplier's preference as to the two offers and fill the offer most desirable to the supplier. Additionally, order matching process may make the determination based upon existing orders contained in incoming order storage 160. For example, the specified secondary fulfillment level might be selected if a 200 unit purchase would complete a collective procurement whereas a 100 unit purchase would not.

Additional fields may also be provided on the purchase order submission screen. For example, the purchaser may specify the latest acceptable shipping date in field 540. This is particularly important in the case where orders are pending to generate a minimum order quantity acceptable to the supplier. For example, a potential purchaser may desire that his offer expire at some date certain rather than waiting, however long it takes, for enough orders to satisfy a minimum quantity for a collective procurement.

Field 590 permits a potential purchaser to specify the maximum shipping cost he is willing to pay. Alternatively, system 10 may use this field to automatically display a non-negotiable shipping cost associated with the requested quantity of items. In field 550, the purchaser can supply shipping address information and in field 525 the purchaser can select a link to provide a separate billing information screen (not shown). After all information has been provided, the purchaser may submit the purchase order by clicking on submit button.

Once the purchaser submits the purchase order via purchaser terminal 15, it is transmitted to transaction processing system 20. As orders are submitted by multiple purchasers they are stored in incoming order storage database 160 under the direction of system control 110 and order matching process 130. Each time an order is received, a collective procurement matching process is initiated by order matching process 130. Order matching process queries both the incoming storage database 160 and the incoming supplier commitment storage database 150 in order to determine if a collective procurement order can be processed as a result of supplier commitments and the collective orders contained in incoming storage 160 as well as the present order at the time it is submitted. In determining whether a collective procurement order can be fulfilled, both primary fulfillment levels and secondary fulfillment levels are checked.

Collective Buy Example

The next portion of the description provides an example of how a collective procurement order may be fulfilled according to one embodiment of the present invention. The following is merely one example based upon hypothetical data. As will be apparent to one of skill in the art, other algorithms and matching procedures may be employed according to the present invention without departing from the scope or spirit thereof.

Assume the incoming supplier commitment storage database includes the following data:

| SUPPLIER ID # | PRODUCT ID # | Minimum Quantity | Minimum Price at Quantity |
| --- | --- | --- | --- |
| 5T76R | 76-65A | 350 | $7.95 |
| 7R56A | 76-65A | 175 | $8.25 |
| 7R56A | 76-65A | 250 | $7.85 |
| 4G79F | 54-99Z | 450 | $4.25 |

Example 1

Assume there are no orders in incoming order storage 160. Assume also that a new order comes in for a quantity of 150 at a purchaser price of $9.00 of item 76-65A. In this case the collective procurement could not yet be fulfilled since no supplier (as reflected by incoming supplier commitment storage database 150) is willing to supply a quantity of this item which is below 175. As a result, the order would be stored in incoming order storage awaiting another order which would serve to satisfy the minimum collective procurement requirement.

Assume that a second order comes in wherein a second purchaser requests 200 of item 76-65A. For simplicity, also assume that this second purchaser has also submitted a purchase order indicating that this purchaser is also willing to pay $9.00 per item. Order matching process 130 will now determine, through a query of both incoming order storage 160 and incoming supplier commitment storage 150, that a request for a total of 350 of item number 76-65A is outstanding. Order matching process 130 may now complete a collective procurement match by processing the order with supplier number 5T76R as the sole source of the item. As a result, a collective procurement match will be processed whereby the first purchaser receives the requested 150 at $9.00 per item and the second purchaser receives the requested 200 also at $9.00 per item. Both orders will be supplied by vendor number 5T76R.

Note that even though the minimum purchase price specified by vendors for the item was below $9.00, the order was fulfilled at the price offered by the purchasers ($9.00). In one embodiment of the present invention, potential purchasers are not aware of the minimum acceptable prices acceptable to the participating suppliers. Alternatively, the system of the present invention may be configured so as to permit potential purchaser to effectively obtain access to the data in incoming supplier commitment storage prior to submitting purchase orders. In the latter case, potential purchaser can know the minimum acceptable pricing for items and/or minimum quantities. If the potential purchaser can not or will not meet the minimum quantity for the item, they can nonetheless offer the requested price and wait until other order come in sufficient to collectively meet the minimum quantity necessary to receive the price. It is also possible to configure the system of the present invention such that the purchaser receive the lower price specified by the suppliers even though they "bid" a higher price.

An alternative result based upon the same order submissions may be that the order is filled by a combination of vendor 5T76R and vendor 7R56A. However, since the total requested quantity is 350 and vendor 5T76R has indicated a minimum quantity of 350 at the specified price, the order would most likely not be split to provide that vendor with a lower quantity than it minimum specified. In the event, the collective order was, for example, a total of 500 items, vendor 5T76R may supply its 350 and the other vendor(s) (in this case 7R56A) would supply the balance. Allocation is, of course, based upon how the system is configured but may be based upon, for example, time of commitment, amount of commitment, vendor status and price offered.

Example 2

The following example demonstrates supplier side fulfillment levels. Just as purchasers can submit orders which vary by time, price and quantity, suppliers can agree to supply goods or services according to different fulfillment levels. As is apparent in the table above, vendor 7R56A has agreed to supply item 75-65A in a quantity of 175 at a price of $8.25. However, if a commitment to purchase a quantity of 250 is obtained (either by a single purchaser or as a collective buy) the vendor is willing to accept a lower price of $7.85 per item. Thus, if an order for 150 came in with a purchase price of $8.00, based upon the data in the table, it would clearly remain unfulfilled. Now suppose a second order for 175 came in from a second purchaser, also specifying a price of $8.00. In this case, a collective order total of 325 exists. This is sufficient to obtain the lower price from vendor 7R56A so the order would be fulfilled for the two purchasers at a price of $8.00 since this is less than the $8.25 minimum at the lower quantity level. Alternatively, since the collective quantity is sufficient for the two purchasers to obtain the $7.85 price, they may receive this price even though they were willing to pay the higher $8.00 price.

As will be apparent to one of skill in the art, the above examples are intended merely to provide information on the system and its operation according to one embodiment. A practically limitless set of configurations and associated algorithms may be employed by the system of the present invention without departing from the scope and spirit thereof.

Reverse Auction Process (RAP)

The present invention may include, either independently or in connection with the collective procurement process described above, a Reverse Auction Process (RAP) capability. The RAP allows potential buyers to specify a maximum price that they are willing to pay for a product or service. But even more importantly, the RAP provides these potential buyers with the possibility of obtaining a price which may be significantly more attractive then the buyer specifies as the maximum price.

This is accomplished through a multiple step reverse auction procedure. According to a preferred embodiment, a potential buyer specifies product/service information (including possibly particular constraints to be associated with the purchase as required by the potential buyer) as well as the maximum price the buyer is willing to pay for the desired product or service. The pricing determination may, in some cases, reflect the quantity desired and/or particular constraints to be attached to the purchase request.

Once the above information is submitted via the system of the present invention, the next step calls for the potential suppliers to take steps to "bid" for the proffered purchase order. This portion of the overall process may occur according to various embodiments. In one embodiment, suppliers, once notified of the purchase request, submit their best price under the maximum price agreed to be paid by the potential buyer. Further, in this embodiment, none of the suppliers are aware of other "bids" made by other suppliers in meeting the purchaser request. Preferably, a deadline is imposed either by the potential purchaser or the system, or both, by which suppliers must submit their bids. Following the deadline, the supplier that has offered to supply the goods/services at the lowest price and meeting all of the potential buyer's requirements, will be automatically selected to fulfill the order. In the event of a tie, the system may either divide the order between the tying suppliers according to a predetermined scheme or use a predetermined algorithm for deciding which supplier shall fulfill the order.

In addition to the "blind" auction process above, the RAP of the present invention may be implemented according to at least one alternative embodiment. One such alternative embodiment calls for bidding suppliers to be made aware of other bids by other suppliers during the reverse auction process. According to this embodiment, one supplier may offer an opening bid and then each other supplier which can meet the requirements can be sequentially offered the opportunity to beat the previous bid. This may be accomplished through the automatic generation of email messages to subscribing suppliers with such suppliers being offered the opportunity to bid through a predetermined deadline. Again, as in the previous embodiment, the supplier offering the best bid will be selected to fulfill the order.

As may be understood by one of skill in the art, the above RAP works best with "commodity" items and services in that potential purchasers will not be as concerned with the supplier as they are with the product or service. Further, the potential purchaser, in this case, can expect that the product or service provided through one supplier will be virtually indistinguishable from the equivalent product or service supplied by another supplier.

Notwithstanding the above, the RAP process (and the collective procurement process in general) may also be applied to "non-commodity" products and services as well. In this case, it is preferable that potential purchasers specify the general class of product or service that they desire as well as the maximum price that they are willing to pay for such product or service. Then, according to one embodiment, potential suppliers that can offer a product or service, as applicable, within the specified class are invited to bid for the opportunity to supply the potential purchaser. As before, the lowest price bid offered by a supplier is presented to the potential purchaser. However, in this case, it is preferable that descriptive details about the specific product or service to be supplied is also presented to the potential purchaser. Once presented with this information and the supply price offer, the potential purchaser may be offered the opportunity to accept or reject the specific bid presented by the system. This is in contrast to the case where a commodity item is desired. In the latter case, it is preferable that the buyer be bound so long as a supply commitment at a price below the maximum price specified by the purchaser is presented.

In addition to the above described embodiments of the RAP, there are a number of alternative embodiments for implementing the system and the process of the present invention. Examples of such alternative embodiments are now discussed. With respect to the initiation of the RAP, rather than the potential purchaser setting a maximum price that he or she is willing to pay, other possibilities exist.

One such possibility is a case wherein a group of potential buyers seeking to obtain the same product or service simply enter their desired quantity without entering a maximum price. In this case, potential sellers may bid through the RAP process to supply the desired product or service at the lowest price possible without regard to any particular constraints set by the potential purchasers. In this case, the lowest bidding supplier than can offer the collectively desired quantity will be the supplier. The system of the present invention may function such that once the grouped buyers all submit requests to purchase, they are bound to accept the lowest offered price despite the fact that no maximum price was set. However, a more reasonable approach is to allow the potential purchasers to collectively or individually accept or reject the lowest bidding seller's offer.

Another possibility also does not require the potential purchaser(s) to specify a maximum price that they are willing to pay but instead, the maximum price for the particular item is specified by the system. Thus, the service operator may develop and maintain a database of pricing information for all items available in the system. In the event no supplier offers the specified price (or a better one) through the RAP, the potential buyers are preferably informed that the item is not currently available at the "recommended maximum price". Potential purchasers, in this case, may be permitted to set their own maximum price above the recommended price reflecting the price they would be willing to pay. At that point, vendors may be invited to attempt to match that price.

Yet another possibility for conducting the RAP process from the potential buyer point of view is to average maximum/target prices set by individual potential purchasers to arrive at a collective maximum price for a collective procurement group purchase request. In addition to a simple average, other algorithms may be employed to determine the ultimate price which must be met on the vendor side for a transaction to be completed.

Service Provider and Supplier-Side Process Initiation

Additional variations exist whereby the RAP process may be initiated by, for example, a service provider operating the system of the present invention. In such a case, a particular product or service or package of products or services may be selected to be "bid out" to subscribing suppliers. These suppliers may then bid to supply the items to prospective purchasers which are to be grouped at a later time. The suppliers and/or the service provider may specify particular constraints which are to be associated with the potential transaction.

By way of example and not limitation, the suppliers or the service provider may specify that the price to be offered will be dependent upon constraints such as buyers geography, shipping date, date of service, quantity, number of buyers and repetitive purchases as well as others.

Profiling and Matching Engine

The present invention may include a profiling engine which operates to determine the needs, requirements and conditions associated with both buyers and sellers using the system of the present invention. The profiling engine functions in connection with various database with the goal of generating and maintaining such databases so that they contain data which may be used by transaction processing system 20 to more effectively match buyers and sellers.

As time goes on and specific buyers and sellers enter more and more purchase orders and supply commitments, respectively, the databases are updated to include a better and better reflection of particular characteristics of both buyers and sellers. This, in turn, allows TPS 20 to more effectively match buyers and sellers both on an ongoing basis and with respect to particular transactions.

In the typical course of business, a seller may manufacture a quantity of goods based upon assumed or estimated demand for those goods. Unfortunately, this often leads to inefficiencies including inventory costs and the need for middlemen and third party distribution channels. The system of the present invention offers the opportunity to eliminate or greatly reduce such inefficiencies by allowing a seller to custom manufacture based upon real demand rather than estimates thereof or assumptions relating thereto. The present invention is most effective in reducing the previous inefficiencies with respect to orders for products and services which are cyclical, predictable and prepaid.

Thus, in one embodiment of the present invention, the profiling engine interacts with buyers and sellers to effectively place both buyers and sellers in particular classes and categories of interest to these buyers and sellers. For example, one such class may be a custom manufacturing class whereby a seller states that it is willing to receive and accept collective orders from large groups of buyers far enough in advance that they can custom manufacture such an order. A buyer may also elect to participate in a custom manufacturing program whereby such a buyer would be grouped with other similarly interested buyers for a product or service. As a result, for example, a paper manufacturer may then be able to custom manufacture 100,000 reams of paper for a custom manufacturing order with the knowledge that once manufactured, the goods will ship directly to specific buyer without the need for specialized (and expensive) distribution channels. Custom orders can also be set up to be provided on a recurring schedule. For example, a group of buyers may be organized so that such group, through the system of the present invention, is set up to pay for and receive one or more particular items and/or services on a regular basis. Additionally, the supplier meeting the need may permit the number of buyers in the group and/or the purchase quantity to increase over time or the supplier may require the volume and/or number of purchasers to be constant.

One of the purposes of the Profiling and Matching Engine is to establish a rules-based system that profiles buyers and sellers at the point of initial registration and over time and learns their buying and selling characteristics. These characteristics will in turn be used to match and aggregate groups of similar buyers into collective buying groups. These collective buying groups will then be matched to groups of sellers whose profiles match the characteristics that the buyers require which may include but not be limited to the types of products or services, quantity, geography, time and shipping needs.

The characteristics used in profiling and matching buyers and sellers include but are not limited to the following list of discrete data points:

Geography
Quantity
Pricing
Time (time between re-supply, time to shipping, time to purchase . . . )
Types of Products or Services
Industry Type
Approval Process/Permissions
Payment Methods/Account Information
Credit Rating These data points will be continuously cross-correlated between each other and across buyers to find, match and aggregate buyers with similar buying patterns and needs and present them to groups of sellers. These discrete data points make up in the whole a user's buying patterns that help the profiling and matching engine to collect similar buyers together.

A similar model of profiling is used to profile sellers and their selling patterns over time to determine which sellers match a buying groups needs in terms of products, services, pricing, time and any other relevant or material profiling criteria. In the case of sellers, particular characteristics such as inventory, capacity, manufacturing capabilities, production cycle times, industry ratings, product specifications and ratings as well as others may be included within the seller profile.

As time goes on and specific buyers and sellers enter more and more purchase orders and supply commitments, respectively, the databases are updated to include a better and better reflection of particular characteristics of both buyers and sellers. This, in turn, allows TPS 20 to more effectively match buyers and sellers both on an ongoing basis and with respect to particular transactions. Thus, the profiling system becomes more and more intelligent over time about users buying and selling patterns and becomes more efficient about matching them together.

Internet Browser Application

The present invention may be practiced in connection with a client or server based Internet application. According to this embodiment, software resident on a server, on the client or via a dynamic download such as Java or some other similar executable, functions to permit buyers to select products and services which they are interested in for purchase. In this embodiment, an icon, logo or other identifying characteristic is displayed somewhere on the screen viewable by the user as the user "surfs the net". By way of example, an icon may be displayed at the bottom right hand corner of the browser window. By selecting the icon the user may be directed to an internet page or set of pages whereby they can order products and services through system 20 and the processes associated therewith.

The icon may also allow buyers to join groups for upcoming product purchases while surfing the web. In this model, a user browses the web to find a specific product or service that he/she would like to buy and then clicks an icon that resides on the desktop (either in the systems tray, on a separate button bar, or in the start menu) or even within a web page or an Internet browser. In one embodiment, the user clicking the icon initiates a program residing on the desktop to record the current web page and, using a search technique known in the art, locates a product or service identifier (i.e.—an ISBN number, SKU number, or another public assigned reference number given by a third party), and automatically adds the user to the respective group of aggregate buyers. The user may have the option to enter additional purchase-specific data fields such as pricing requirements, purchase timeline/needs, etc. Once added, the program notifies the user that he/she has been successfully added to the group and reports on the groups current number of aggregated users and status of order. The button may also provide access to all of the users current groups and pending purchases so he/she may modify or delete them at any time (pre-purchase).

The icon may also be used as a simple buyer aggregation tool whereby the user directly enters purchase information about the product without using search process described above. In the event that the user's profile indicates an interest in a pending purchase group, the user may be notified via a "pop-up" window that is triggered by clicking the icon. Additional method for buyer aggregation include using the telephone to join groups by leaving a voice message, using voice recognition software, or using a menu-driven phone system or by traditional mail delivery (postal, FedEx, UPS, etc.). In each of these scenarios, the user may access/refer to his/her profile, request the ability to join a product-purchasing group, and receive a confirmation and group status report.

An additional embodiment of this invention is an alerting or metering functionality that alerts buyers regarding how many buyers have joined a group buy and much time is left before the group order is closed. Such an alerting or metering functionality is important to allow buyers and sellers know how many more buyers are needed before a collective sell is closed and submitted to the Reverse Auction Process.

Another embodiment of this invention is a self-organizing community function that allows similarly interested buyers to join self-organized communities dedicated to a specific interest, industry, product or service. Such communities of buyers can in turn alert one another regarding buy and sell orders and help members of their communities join a collective buy.

Pre-paid and Post-paid Collective Procurement Identification System

Groups of buyers may join to buy or commit to buy a service or product in advance of use or delivery. This method is especially effective for non-time sensitive, location-specific, continuous use, sporadic use or non-deliverable items. In this case, buyers will use some form of identification at the point of use to identify them as belonging to the collective group of buyers. Identification may be in the form of a driver's license, identification number or some form of membership card recording the collective procurement order. These identification cards or numbers allow groups of buyers to buy items well in advance of use and then be able to purchase the item or service at a discount when they actually need the said item or service. In one example, a group of buyers would commit to buying $1000 of shipping from Federal Express. The group of buyers may then each receive some form of identification in the shape of a number, card or data that they can then use whenever they use Federal Express. That identification allows them to receive the group discount they received from the collective purchase of shipping services from Federal Express. In this embodiment the payment may be in the form of a pre-paid or post-paid arrangement where the buyers either make payment prior to using the service or at the point of use or after the point of use of the service. Pre-paid or post-paid arrangements may be in the form of a one time lump payment or periodic payments with or without interest.

While various preferred embodiments of the present invention have been illustrated and described, it will be apparent that various modifications and alterations may be made thereto without departing from the spirit of the invention or the scope of the appended claims. By way of example only, the present invention may be practiced in various environments and on various platforms including handheld PCs, personal digital assistants and wireless and wired telecommunications products and networks.

We claim:

1. A collective procurement management system comprising:
   a processor; and
   a memory in communication with the processor, the memory storing a plurality of processing instructions that enable the processor to:
      generate a profile for each of a plurality of purchasers based on their purchasing characteristics over a period of time, the profile characteristics including types of items ordered, quantities of items ordered, location and shipping needs;

generate a profile for each of a plurality of sellers based on types of items provided, industry type, payment methods used, order shipment time and credit rating;

provide to each of the plurality of sellers a macro for automatically uploading a catalog of items available for purchase, including a minimum price and a minimum order size of each of the items;

provide the minimum price and the minimum order size to the plurality of purchasers prior to a submission of a purchase request;

receive a purchase request from each of the plurality of purchasers for an item, each purchase request including at least one separate purchase price for the item, a separate quantity of the item, and a separate delivery condition for the item;

receive, from each of a plurality of sellers, a bid for a supply commitment for the item, each bid including a plurality of supply prices for the item, each supply price corresponding to a quantity of the item to be included in an order;

group said plurality of purchase requests, based on the item and the purchase price, into a collective procurement order;

identify at least one of the plurality of sellers for supplying the item for the collective procurement order based on the received bids;

identify a final supply price for the collective procurement order based on the ordered quantity of the item in the collective procurement order and the received bids; and fulfill said collective procurement order by matching at least one of the identified suppliers to at least one of said plurality of purchasers, based on a comparison of the profile of each purchaser with the profile of each identified supplier, and further based on each requested purchase price and received delivery condition compared to the supply commitment received for each identified supplier, at least one of said purchase requests being fulfilled at the final supply price when the final supply price is lower than the purchase price included in said purchase request.

2. The system of claim 1, said memory further comprising an inventory database including a listing of at least one item available for purchase by the plurality of purchasers.

3. The system of claim 1 wherein the processor groups each purchase request based on a similar item requested by the plurality of purchasers.

4. The system of claim 1 wherein the processor groups each purchase request only if the purchase requests specify the same item.

5. The system of claim 1 wherein the processor fulfills the collective procurement order if the plurality of purchase requests satisfy at least one threshold condition.

6. The system of claim 5, said threshold condition including a minimum number of purchasers in the collective procurement order.

7. The system of claim 5, said threshold condition including a minimum quantity of requested items in the collective procurement order.

8. The system of claim 5, said threshold condition including a minimum total order price for the collective procurement order, the total order price based on the plurality of purchase prices and a number of requested items in the collective procurement order.

9. A method for fulfilling a collective procurement order between at least one supplier and a plurality of purchasers, the method comprising:

generating a profile for each of a plurality of purchasers based on their purchasing characteristics over a period of time, the profile characteristics including types of items ordered, quantities of items ordered, location and shipping needs;

generating a profile for each of a plurality of sellers based on types of items provided, industry type, payment methods used, order shipment time and credit rating;

providing to each of the plurality of sellers a macro for automatically uploading a catalog of items available for purchase, including a minimum price and a minimum order size of each of the items;

providing the minimum price and the minimum order size to the plurality of purchasers prior to a submission of a purchase request;

receiving a purchase request from each of a plurality of purchasers for an identified item, the purchase request including at least one separate purchase price, a separate quantity of the identified item, and a separate delivery condition for the identified item;

receiving from each of a plurality of sellers, a bid for a supply commitment for the identified item, each bid including a plurality of supply prices for the identified item, each supply price corresponding to a quantity of the identified item to be included in an order;

grouping said plurality of purchase requests, based on the identified item and the purchase price, into a collective procurement order;

identifying at least one of the plurality of sellers for supplying the identified item for the collective procurement order, based on the received bids;

identifying a final supply price for the collective procurement order based on the quantity of the identified item in the collective procurement order and the received bids; and fulfilling said collective procurement order by matching at least one of the identified suppliers to at least one of said plurality of purchasers, based on a comparison of the profile of each purchaser with the profile of each identified supplier, and further based on each requested purchase price and received delivery condition compared to the supply commitment received for each identified supplier, at least one of said purchase requests being fulfilled at the final supply price when the final supply price is lower than the purchase price included in said purchase request.

10. The method of claim 9 wherein each of said suppliers fulfill at least a portion of each purchase request.

11. The method of claim 9, said fulfilling further comprising:

fulfilling the collective procurement order only if a minimum total quantity of the identified item is ordered from the plurality of purchase requests.

12. The method of claim 9, said fulfilling further comprising:

fulfilling said collective procurement order only if a minimum number of purchasers are grouped.

13. The method of claim 9, said fulfilling further comprising:

fulfilling the collective procurement order only if a minimum total order price is established for the collective procurement order, based on the plurality of purchase requests.

14. The method of claim 9 wherein said purchase price received from each of said purchasers includes a plurality of prices, each price corresponding to different quantities of the identified item in the purchase request.

15. The method of claim 9, further comprising
receiving at least one acceptable price from the at least one supplier, each acceptable price corresponding to a total quantity of the identified item in the collective procurement order.

16. The method of claim 9, each said purchase request specifying at least one additional purchase condition in connection with the identified item.

17. An apparatus for completing collective procurement management orders, comprising:
- means for generating a profile for each of a plurality of purchasers based on their purchasing characteristics over a period of time, the profile characteristics including types of items ordered, quantities of items ordered, location and shipping needs;
- means for generating a profile for each of a plurality of sellers based on types of items provided, industry type, payment methods used, order shipment time and credit rating;
- means for providing to each of the plurality of sellers a macro for automatically uploading a catalog of items available for purchase, including a minimum price and a minimum order size of each of the items;
- means for providing the minimum price and the minimum order size to the plurality of purchasers prior to a submission of a purchase request;
- means for receiving a purchase request from each of a plurality of purchasers for an identified item, the purchase request including at least one separate purchase price, a separate quantity of the identified item, and a separate delivery condition for the identified item;
- means for receiving, from each of a plurality of sellers, a bid for a supply commitment for the identified item, each bid including a plurality of supply prices for the identified item, each supply price corresponding to a quantity of the identified item to be included in an order;
- means for grouping said plurality of purchase requests, based on the identified item and the purchase price, into a collective procurement order;
- means for identifying at least one of the plurality of sellers for supplying the identified item for the collective procurement order, based on the received bids;
- means for identifying a final supply price for the collective procurement order based on the quantity of the identified item in the collective procurement order and the received bids; and
- means for fulfilling said collective procurement order by matching at least one of the identified suppliers to at least one of said plurality of purchasers, based on a comparison of the profile of each purchaser with the profile of each identified supplier, and further based on each requested purchase price and received delivery condition compared to the supply commitment received for each identified supplier, at least one of said purchase requests being fulfilled at the final supply price when the final supply price is lower than the purchase price included in said purchase request.

18. The apparatus of claim 17, said purchase request including at least one additional purchase criteria.

19. The apparatus of claim 17, further comprising:
means for notifying at least one purchaser of a pending collective procurement order based upon profile information of the purchaser.

20. The apparatus of claim 17, further comprising:
means for identifying, to the at least one supplier, a number of purchase requests forming said collective procurement order, wherein said supply price is based on the number of purchase requests.

21. The apparatus of claim 17, further comprising:
means for notifying the plurality of purchasers of an amount of time remaining prior to a closing of the collective procurement order.

22. The system of claim 1, said plurality of purchasers comprising at least two purchasers providing different purchase prices.

23. The method of claim 9, said plurality of purchasers comprising at least two purchasers providing different purchase prices.

* * * * *